(12) United States Patent
Blake

(10) Patent No.: US 9,295,236 B2
(45) Date of Patent: *Mar. 29, 2016

(54) AQUARIUM WITH ADJUSTABLE LIGHTING

(71) Applicant: YORKTOWN TECHNOLOGIES, L.P., Austin, TX (US)

(72) Inventor: Alan Blake, Austin, TX (US)

(73) Assignee: YORKTOWN TECHNOLOGIES, L.P., Austin, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/244,769

(22) Filed: Apr. 3, 2014

(65) Prior Publication Data

US 2014/0216351 A1    Aug. 7, 2014

Related U.S. Application Data

(63) Continuation of application No. 11/767,562, filed on Jun. 25, 2007, now Pat. No. 8,727,554.

(51) Int. Cl.
*F21V 33/00*       (2006.01)
*A01K 63/00*       (2006.01)
(Continued)

(52) U.S. Cl.
CPC ............ *A01K 63/006* (2013.01); *A01K 61/025* (2013.01); *A01K 63/042* (2013.01); *A01K 63/045* (2013.01); *A01K 63/06* (2013.01); *F21V 23/04* (2013.01); *F21W 2131/308* (2013.01); *F21Y 2101/02* (2013.01)

(58) Field of Classification Search
CPC   A01K 63/006; A01K 63/06; F21W 2131/308
USPC ......................................................... 362/101
See application file for complete search history.

(56) References Cited

U.S. PATENT DOCUMENTS 3,836,765 A    9/1974  Ritzow et al.
3,850,987 A    11/1974 Haglid et al.
(Continued)

FOREIGN PATENT DOCUMENTS

JP    10162609    6/1998
JP    11213953    8/1999
(Continued)

OTHER PUBLICATIONS

Office Action dated Mar. 3, 2004 in U.S. Appl. No. 10/627,176, filed Jul. 25, 2003 (10pages).

(Continued)

*Primary Examiner* — Jason Moon Han
(74) *Attorney, Agent, or Firm* — Vista IP Law Group LLP

(57) ABSTRACT

An aquarium having an adjustable lighting system for enhancing the display of fluorescent objects, such as fluorescent fish, contained within the aquarium under various external lighting conditions, such as a dark room or a brightly lit room. The aquarium comprises a tank and a plurality of light sources. Each light source emits light at a different wavelength spectrum which is selected to enhance the display of the fluorescent object under each type of external lighting condition. An electronic control is provided to control the operation of the plurality of light sources such that each light source may be selectively turned on/off based on the external lighting condition, or chronological criteria, to provide the best viewing experience.

25 Claims, 3 Drawing Sheets

(51) Int. Cl.
  *A01K 63/06* (2006.01)
  *A01K 61/02* (2006.01)
  *A01K 63/04* (2006.01)
  *F21V 23/04* (2006.01)
  *F21W 131/308* (2006.01)
  *F21Y 101/02* (2006.01)

(56) References Cited

U.S. PATENT DOCUMENTS

| | | | |
|---|---|---|---|
| 3,892,199 | A | 7/1975 | Huyler |
| 4,133,294 | A | 1/1979 | Bolton et al. |
| 5,054,424 | A | 10/1991 | Sy |
| 5,089,940 | A | 2/1992 | Lanzarone et al. |
| 5,324,940 | A | 6/1994 | Ekstrom |
| 5,625,048 | A | 4/1997 | Tsien et al. |
| 5,775,260 | A | 7/1998 | Jansen |
| 6,066,476 | A | 5/2000 | Tsien et al. |
| 6,090,919 | A | 7/2000 | Cormack et al. |
| 6,172,188 | B1 | 1/2001 | Thastrup et al. |
| 6,190,591 | B1 | 2/2001 | van Lengerich |
| 6,232,107 | B1 | 5/2001 | Bryan et al. |
| 6,265,548 | B1 | 7/2001 | Pavlakis et al. |
| 6,380,458 | B1 | 4/2002 | Lin |
| 6,469,154 | B1 | 10/2002 | Tsien et al. |
| 6,473,500 | B1 | 10/2002 | Risafi et al. |
| 6,474,265 | B1 | 11/2002 | Powell |
| 7,135,613 | B1 | 11/2006 | Gong et al. |
| 2002/0178461 | A1 | 11/2002 | Lin |
| 2003/0092098 | A1 | 5/2003 | Bryan et al. |
| 2003/0157519 | A1 | 8/2003 | Zhang et al. |
| 2003/0173525 | A1 | 9/2003 | Seville |
| 2003/0175809 | A1 | 9/2003 | Fradkov et al. |
| 2003/0221206 | A1 | 11/2003 | Schatten et al. |
| 2004/0143864 | A1 | 7/2004 | Gong et al. |
| 2005/0034677 | A1 | 2/2005 | Blake et al. |
| 2005/0044617 | A1 | 3/2005 | Mueller et al. |
| 2005/0135104 | A1* | 6/2005 | Crabb .................. A01G 7/045 362/276 |

FOREIGN PATENT DOCUMENTS

| | | |
|---|---|---|
| WO | WO96/03034 | 8/1996 |
| WO | WO98/15627 | 4/1998 |
| WO | WO98/56902 | 12/1998 |
| WO | WO00/49150 | 8/2000 |
| WO | WO01/27150 | 4/2001 |

OTHER PUBLICATIONS

Response to Office Action dated Aug. 31, 2004 in U.S. Appl. No. 10/627,176, filed Jul. 25, 2003 (5pages).
Office Action dated Nov. 23, 2004 in U.S. Appl. No. 10/627,176, filed Jul. 25, 2003 (20pages).
Office Action dated Aug. 27, 2007 in U.S. Appl. No. 11/011,822, filed Dec. 14, 2004 (13pages).
Office Action dated Feb. 23, 2009 in U.S. Appl. No. 12/164,051, filed Jun. 28, 2008 (8pages).
Muller et al. "Activator effect of coinjected enchancers on the muscle-specific expression of promoters of zebrafish embryos" Mol. Reprod. Dec. 1997, 47(4), 404-412 (cont.).
(Eng). Chem. abstr. vol. 127, No. 10, Sep. 8, 1997 (Columbus, Ohio, USA).
Shaner et al. "A guide to choosing fluorescent proteins", Nature Methods, vol. 2. No. 12, Dec. 2005 (11 pages).

* cited by examiner

AQUARIUM WITH ADJUSTABLE LIGHTING

RELATED APPLICATIONS

This is a continuation of U.S. patent application Ser. No. 11/767,562, filed Jun. 25, 2007, now U.S. Pat. No. 8,727,554, issued May 20, 2014. The contents of the aforementioned patent application is hereby incorporated herein by reference in its entirety. Priority to the aforementioned application is hereby expressly claimed in accordance with 35 U.S.C. §120 and any other applicable statutes or laws.

FIELD OF THE INVENTION

The present invention relates generally to aquariums and more particularly to aquariums having adjustable lighting systems, for example, for enhancing the display of fluorescent objects, such as fluorescent fish, contained within the aquarium.

BACKGROUND OF THE INVENTION

Aquariums are typically comprised of a tank which can be filled with water, a system for maintaining the condition of the water (e.g. filter, aeration pump, heater), and ornamental features such as plants, gravel, rocks and curios. The tank may be of any shape such as rectangular tanks or round bowls, and the sides of the tank are typically transparent. The aquarium may also be provided with a lighting system.

Various fish tank lighting systems have been previously shown and described. For example, U.S. Pat. Nos. 3,836,765 and 5,089,940 describe lighting systems comprising a cover and a lighting fixture housed in the cover. The cover is configured to rest on the top of an aquarium tank.

U.S. Pat. No. 7,135,613, by Gong et al. (which is incorporated by reference herein in its entirety), discloses many different types of transgenic fluorescent fish and various methods of producing such fish. For instance, zebra fish transfected with green fluorescent protein (GFP) genes isolated from a jelly fish (*Aqueoria Victoria*) are described in detail. In addition, numerous modified mutants of GFP are disclosed, for example, various colors and mammalian optimized mutants are described. Fluorescence is the emission of light resulting from the absorption of excitation light. For example, GFP has a maximum excitation at a wavelength of 395 nm and emits green fluorescence at a wavelength (maximum) of 508 nm. The transgenic ornamental fish described in U.S. Pat. No. 7,135,613 (which is incorporated by reference herein in its entirety) are genetically engineered by introducing genes into the fish which express fluorescent proteins. By positioning the fluorescent gene under the control of a specific promoter, the fluorescent protein genes may be used to express the fluorescent proteins in specific tissues, such as in skin tissue, muscle tissue or bone tissue. Gong et al. disclose fish containing numerous different fluorescent proteins, including green fluorescent protein (GFP), enhanced green fluorescent protein (eGFP), yellow fluorescent protein (YFP), enhanced yellow fluorescent protein (eYFP), blue fluorescent protein (BFP), enhanced blue fluorescent protein (eBFP), cyan fluorescent protein (CFP) and enhanced cyan fluorescent protein (eCFP). There are also various colors of coral fluorescent proteins (available from Clontech, Inc.) which are suitable for creating transgenic ornamental fish. A summary of fluorescent protein genes is available on Table 1.

An aquarium for displaying fluorescent fish is described in U.S. patent application Ser. No. 10/627,176, filed Jul. 25, 2003, the disclosure of which is hereby incorporated by reference in its entirety.

All patents and patent applications referenced in this application are hereby incorporated by reference herein in their entirety.

SUMMARY OF THE INVENTION

The aquarium and aquarium kit of the present invention is directed to enhancing the display of fluorescent ornamental plants, animals or other animate or inanimate objects ("fluorescent objects") contained within the aquarium, such as wild-type fluorescent fish and transgenic fluorescent fish, under various ambient lighting conditions. The aquarium comprises a tank for containing a volume of water, at least two different light sources, and at least one control for controlling the operation of the light sources.

A first light source of the aquarium is configured to emit light at a first wavelength which enhances the display of the fluorescent objects under dark external lighting conditions. For instance, in a dimly lit or dark room, such as at night, the ambient light within the tank will be lit very little from the external light, and most of the light within the tank will emanate from the aquarium's light source(s). Under dark external lighting conditions, the display of the fluorescent objects will be enhanced by a first light source which causes the fluorescent objects to fluoresce, but which otherwise creates minimal visible ambient light within the tank. As an example, a black light emits ultra-violet light which is mostly outside the visible spectrum, but which causes many fluorescent materials to fluoresce. The result is that the fluorescent objects stand out brightly amidst the mostly dark ambient visible light within the tank, thereby enhancing the display of the fluorescent objects.

The aquarium further comprises a second light source configured to emit light at a second wavelength which enhances the display of the fluorescent objects under bright external lighting conditions. In daylight, or in a brightly lit room, the external lighting will create significant light within the tank. Accordingly, the ambient light within the tank will be relatively bright regardless whether the aquarium light source(s) provide any light within the tank. Thus, the amount of visible light provided within the tank by the aquarium light sources is mostly insignificant, as compared to the light created by the bright external lighting condition. In this situation, the display of the fluorescent objects is best enhanced by maximizing the intensity of the fluorescent excitation light source. Since a black light has a relatively low intensity (because most of the visible light is filtered out), a blue light or even a white light best enhances the display of the fluorescent objects under bright external lighting conditions.

In another aspect of the present invention, a viewing ratio is defined as the ratio of the intensity of the visible fluorescent light emitted by the fluorescent objects to the intensity of the visible ambient light within the tank. Thus, in another feature of the present invention, the first light source is configured to emit light at a first wavelength spectrum selected to obtain a viewing ratio under a dark external lighting condition of at least 75% of the highest possible viewing ratio for any achievable wavelength spectrum (also defined herein as the "percentage of the maximum viewing ratio"). For example, a laser light source emitting at the maximum excitation wavelength of the fluorescent object and which emits substantially no visible light, would provide for the highest possible viewing ratio. Similarly, the second light source may be configured to emit light at a second wavelength spectrum selected to obtain a viewing ratio of at least 75% of the maximum viewing ratio under a bright external lighting condition. Alternatively, the first and second light sources may provide for a viewing ratio of at least 50%, or at least 40%, or at least 25%, of the maximum viewing ratio for the respective external lighting condition.

The control for the light sources may a simple on/off switch for each light source, or one multi-positional switch that controls all light sources. Alternatively, the control may comprise a light sensor and the control may be configured to automatically, selectively control the light sources based at least in part on the lighting condition sensed by the light sensor. Another alternative would be to control the lighting source(s) through use of a timer, which would be set based on clock time (i.e. relative time), or a pre-determined number of hours for any particular setting. For example, without limitation a black light may stay on for exactly four hours, at which time a white light may come on, or a black light may stay on from 8 pm until 6 am, at which point a white light might come on. It should be understood that a timing device may control any light source(s) in a similar fashion.

In another feature of the present invention, the light source(s) may comprise an array of lights, such as an array of LED (light emitting diode) lights. Each array may be configured to primarily emit light of a certain desired wavelength spectrum. For example, one array of LEDs may emit blue light, while another array of LEDs emits ultraviolet light.

The ornamental fish may be a transgenic fish comprising one or more chimeric fluorescence genes which expresses one or more fluorescent proteins at a level sufficient such that the fish fluoresces upon exposure to the excitation light source.

In addition, the aquarium kit may comprise an ornamental fish which expresses one or more fluorescent protein genes at a level sufficient such that said fish fluoresces upon exposure to the excitation light source. The ornamental transgenic fish may comprise one or more fluorescent protein genes, including for example, without limitation, the following genes: GFP, eGFP, BFP, eBFP, YFP, eYFP, CFP, eCFP, reef coral fluorescent protein ("RCFP"), or any of the genes that code for expression of the fluorescent proteins listed in Table 1. It should be understood that each foregoing abbreviation identifies a fluorescent protein gene, which encodes a fluorescent protein. For example, "GFP" is used to identify the Green Fluorescent Protein Gene, which encodes green fluorescent protein. The fish may also comprise bio-luminescent proteins such as luciferase, where such bio-luminescent proteins would cause the fish to bio-luminesce. The ornamental transgenic fish may be any variety of aquatic animal, including without limitation, zebrafish, medaka, goldfish, carp, koi, tilapia, glassfish, catfish, angel fish, discus, eel, tetra, goby, gourami, guppy, *Xiphophorus*, hatchet fish, Molly fish, or pangasius. The kit may also comprise a fluorescent ornamental organism other than a fish, for example, including without limitation, fluorescent frogs, crabs, and shrimp.

DETAILED DESCRIPTION OF THE INVENTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
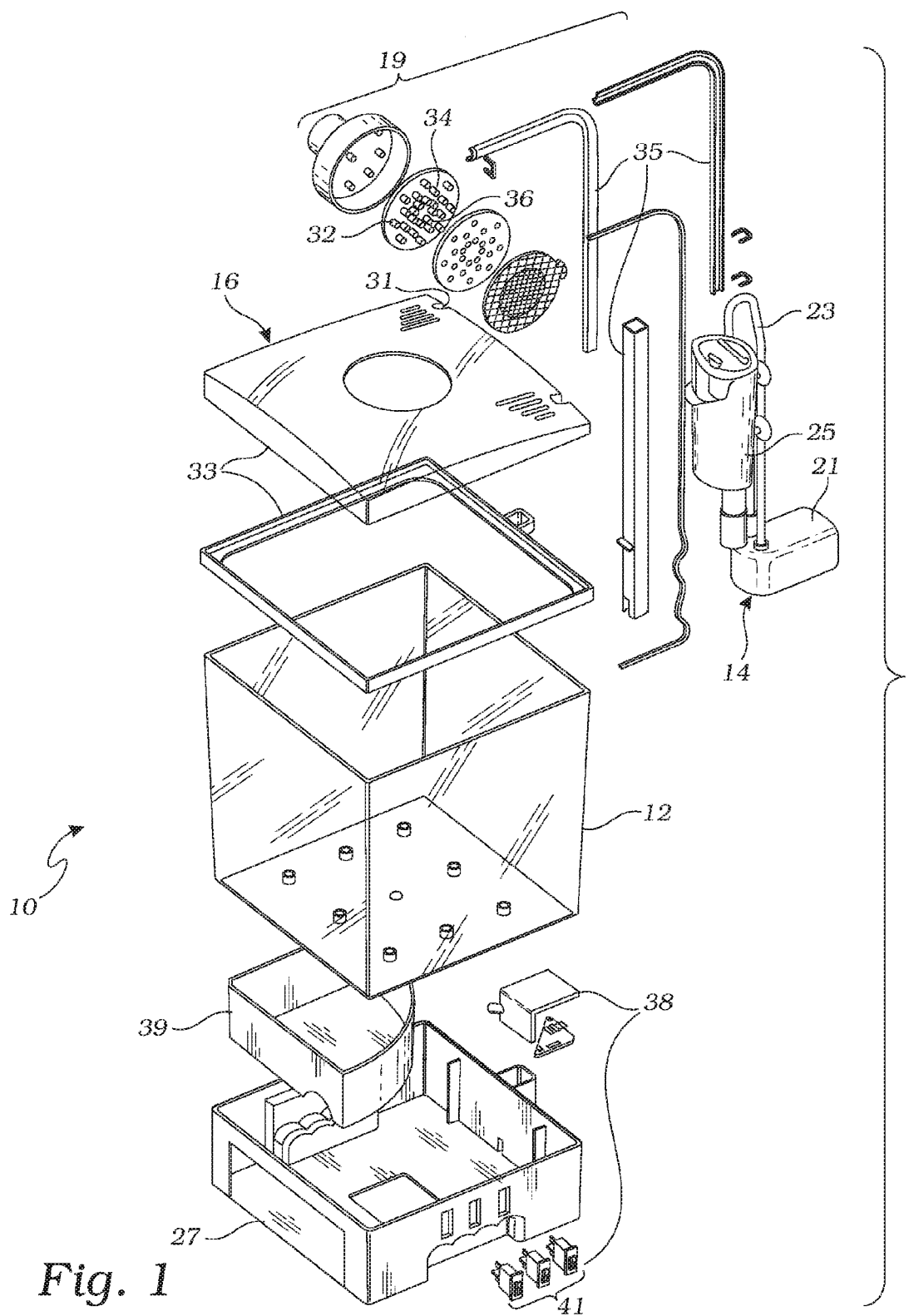
FIG. 1 is a perspective exploded view of an aquarium kit in accordance with an exemplary embodiment of the present invention.

Referring to FIG. 1, an aquarium 10 according to one exemplary embodiment of the present invention is shown. The aquarium 10 is specially designed with adjustable lighting in order to enhance the display of fluorescent objects contained within the aquarium. The fluorescent objects may be fluorescent plants or fluorescent animals such as fluorescent fish, or fluorescent frogs.

The aquarium 10 comprises a tank 12, a water conditioning system 14, a cover 16 and a base 27. The water conditioning system 14 comprises an aeration pump 21 which is connected to a filter/diffuser 25 by an air line tube 23. The aquarium 10 is assembled by placing the filter/diffuser into the tank and affixing it to the side of the tank. The cover 16 is then placed onto the top of the tank 12 with the air line tube 23 extending through a slot 31 in the cover 16. The base 27 has a storage drawer 39 for storing fish food and other supplies, such as water conditioner.

The cover 16 has appropriately sized opening which allows the light to directly hit the water without being reflected by the cover. A lighting module 19 is attached to the aquarium 10 using a bracket 35 which attaches to the aquarium base 27. The housing 33 may be designed to cover all or just a portion of the open top of the tank 12. Although the lighting module 19 in the embodiment of FIG. 1 is shown mounted to the base 27 through a bracket 35, it is contemplated that the lighting module 19 may be attached to any part of the tank 12, including the walls of the tank 12, the top edge of the tank 12, the cover 16, or even inside the tank 12 as part of a curio 22 (see FIG. 3; for example, a translucent or transparent rock with an excitation light inside).

The lighting module 19 comprises three light sources, namely a first light source 32, a second light source 34, and a third light source 36. It is to be understood that any number of multiple light sources may be utilized, including four, five, six or more light sources. Each light source 32, 34, 36 comprises a circular array of eight LED lights, with each array located at a different radius of the lighting module 19. The first light source 32 is located at the outer radius, the second light source 34 is in the middle, and the third light source 36 is in the inner radius. Each light source 32, 34, 36 is operably connected to an electronic control 38. The electronic control 38 comprises three switches 41 for controlling each of the three light sources 32, 34, 36.

The electronic control 38 may be as simple as an on/off toggle switch for each light source as shown in FIG. 1. Alternatively, the electronic control 38 may comprise a single multi-position switch (such as a rotating switch) such that each position of the switch turns on/off different light sources. For example, a first position of the toggle switch may turn on the first light source 32, but turn off both the second and third light sources 34, 36. In a second position, the toggle switch may turn off the first light source 32, turn on the second light source 34, and turn off the third light source 36, and so on. The toggle switch may also be configured to turn on any one of the light sources, or any combination of two or more of the light sources.

In another feature of the present invention, the electronic control 38 may comprise a light sensor (not shown). The light sensor is configured to detect the intensity of the external lighting conditions, for example, a dark external lighting condition, a moderate external lighting condition or a bright external lighting condition. The electronic control 38 may then comprise an electronic circuit and components, as would be understood by one of skill in the art, to automatically, selectively control the light sources 32, 34, 36 based on the external lighting condition detected by the light sensor to enhance the display of fluorescent objects within the aquarium 10, as described in further detail below. For example, the electronic control 38 may comprise a processor or other logic control, which receives an input signal from the light sensor, such as a voltage or current. The voltage or current can be related to the light intensity sensed by the light sensor. Based on this input, the control 38 selectively controls the light sources 32, 34, 36.

In another feature of the present invention, the electronic control 38 may comprise a timer that allows for the light source(s) to be turned on and off based on pre-determined chronological settings. For example, without limitation, a black light may stay on for exactly four hours, at which time the white light may come on, or a black light may stay on from 8 pm until 6 am (setting based on relative time), at which point a white light might come on. It should be understood that a timing device may control any light source(s) in a similar fashion.

Figure 2:
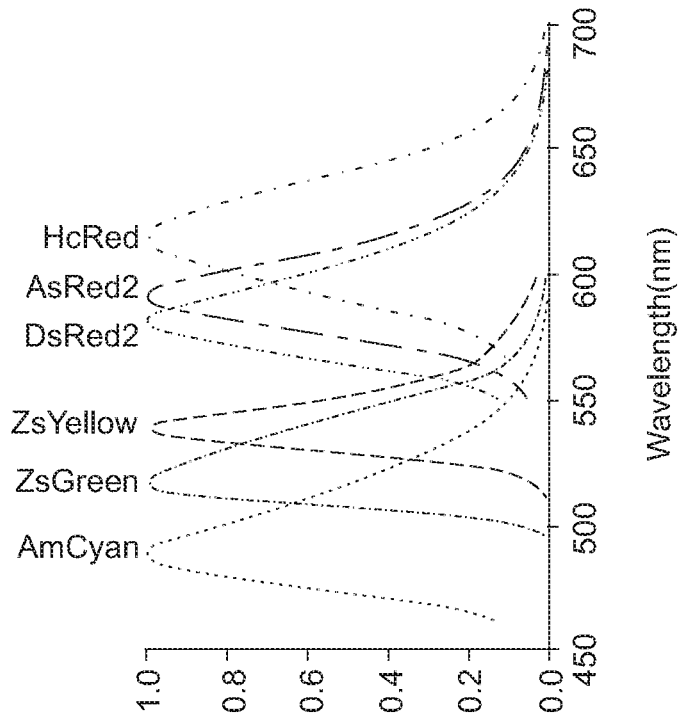
FIG. 2 is a chart of the excitation spectra and emission spectra for various fluorescent protein genes.
Figure 2:
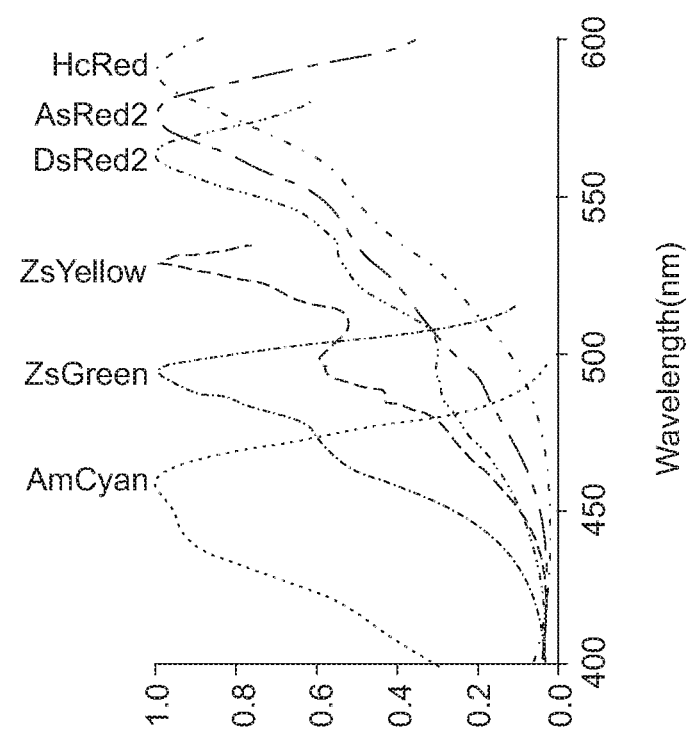

The first, second and third light sources 32, 24, 36 are specifically configured to emit light at wavelength spectra selected to enhance the display of fluorescent objects within the aquarium 10 under various external lighting conditions. Fluorescent materials fluoresce upon exposure to excitation light over a range (spectrum) of excitation wavelengths and similarly emit light over a spectrum of wavelengths. The excitation spectra and emission spectra for various fluorescent proteins are shown in FIG. 2. Table 1 below lists the maximum excitation and emission wavelengths for various fluorescent proteins.

TABLE 1

Maximum Excitation and Emission Wavelengths
for Fluorescent Proteins ("FP")

| FP | Excitation max (nm) | Emission max (nm) |
|---|---|---|
| AmCyan1 | 458 | 489 |
| ZsGreen1 | 493 | 505 |
| ZsYellow1 | 529 | 539 |
| DsRed2 | 563 | 582 |
| DsRed-Express | 557 | 579 |
| AsRed2 | 576 | 592 |
| HcRed1 | 588 | 618 |
| mPlum | 590 | 649 |
| mCherry | 587 | 610 |
| tdTomato | 554 | 581 |
| mStrawberry | 574 | 596 |
| J-Red | 584 | 610 |
| DsRed-monomer | 556 | 586 |
| mOrange | 548 | 562 |
| mKO | 548 | 559 |
| MCitrine | 516 | 529 |
| Venus | 515 | 528 |
| Ypet | 517 | 530 |
| EYFP | 514 | 527 |
| Emerald | 487 | 509 |
| EGFP | 488 | 507 |
| CyPet | 435 | 477 |
| mCFPm | 433 | 475 |
| Cerulean | 433 | 475 |
| T-Sapphire | 399 | 511 |

Referring to Table 1 and FIG. 2, it can be seen that DsRed2 has a maximum excitation at a wavelength of 563 nm. This means that an excitation light that emits a high intensity of light at 563 nm will optimally cause this particular fluorescent protein to fluoresce. Therefore, because the wavelength at which DsRed2 has a maximum excitation is also in the visible range of light, the excitation light will be visible as well as the emitted fluorescent light thereby reducing the relative brightness of the emitted light. Generally, this will not be optimal for viewing these fluorescent fish, particularly under dark external lighting conditions. A chart of visible light is shown in Table 2 below.

TABLE 2

Chart of Colors of Visible Light
Colors of Visible Light

| WAVELENGTH (nm) | PERCEIVED COLOR |
|---|---|
| ~410 | Violet |
| ~440 | Blue |
| ~500 | Green |
| ~580 | Yellow |
| ~650 | Red |

External light conditions can be quantified in terms of the light level or "illuminance" surrounding the aquarium. Illumenance is typically measured in foot candles (ftcd, fc) or lux in the metric SI system. A foot candle is actually one lumen of light density per square foot, one lux is one lumen per square meter. Some common, approximate, light levels for various indoor and outdoor conditions are listed in Table 3 below:

TABLE 3

Common Light Levels - Indoors and Outdoors

| Condition | Illumination (lux) |
|---|---|
| Full Daylight | 10,000 |
| Overcast Day | 1000 |
| Lighted Home | >150 |
| Lighted Office | 500 |
| Dark Indoor Room | <50 |
| Moderately Lit Room | 100-150 |

With these concepts in mind, each of the lights sources 32, 34, 36 may be configured to emit light at a desired wavelength spectra selected to enhance the display of fluorescent objects within the aquarium 10 under various external lighting conditions. For example, the three light sources may be configured to enhance the display under the following three external lighting conditions: (a) a dark external lighting condition (defined herein to mean less than 50 lux); (b) a moderate external lighting condition (defined herein to mean 50-200 lux); or (c) a bright external lighting condition (defined herein to mean greater than 200 lux). This may entail configuring each light source 32, 34, 36 to individually be lighted for a particular lighting condition, or a combination of two or more of the light sources 32, 34, 36 for a particular lighting condition. An example of dark external lighting condition would be a dimly lit or dark room, such as at night. An example of a moderate external lighting condition would include a room having enough functional light to read or watch TV, but less than daylight, and an example of a bright external lighting condition would be a room brightly lit from daylight or other light sources.

For instance, the lighting module 19 may be configured to use only the first light source 32 under dark external lighting conditions, only the second light source 34 under moderate external lighting conditions, and only the third light source 36 under bright external lighting conditions. In this example then, the first light source 32 is configured to emit light at a first wavelength spectrum (with a maximum peak emission wavelength different from the maximum peak emission wavelengths of both the second and third wavelength spectra) which causes the fluorescent object within the aquarium 10 to fluoresce brightly, but which otherwise creates minimal visible ambient light within the tank 12. A light which emits an excitation wavelength of the fluorescent material, but that is mostly out of the visible spectrum ultraviolet light is a proper choice. The first light source 32 may be a black light which emits mostly ultra-violet light which is mostly outside the visible spectrum, but which also will cause many fluorescent materials to fluoresce. For purposes of this application, the ultra-violet range is defined as light having a wavelength shorter than 410 nm. In the terms of the viewing ratio as defined above, the first light source 32 is configured to emit light at a first wavelength spectrum which obtains a viewing ratio under a dark external lighting condition of at least 75%, or at least 50%, or at least 40%, or at least 25%, of the maximum viewing ratio.

Continuing with this example, with a moderate external lighting condition in mind, the second light source 34 is configured to emit light at a second wavelength spectrum (with a maximum peak emission wavelength different from the maximum peak emission wavelengths of both the first and third wavelength spectra) which causes the fluorescent object within the aquarium 10 to fluoresce brightly, and it is less important whether it otherwise creates visible ambient light within the tank 12. Thus, the second light source 34 may have a higher intensity near an excitation wavelength peak for the fluorescent object, even if that peak is in the visible range. An appropriate choice for the second light source 34 may be a light which emits mostly blue light, a higher intensity light in the excitation wavelength range of many fluorescent materials. As used herein, the blue light range is considered to be light having a wavelength of about 460 nm-480 nm. In the terms of the viewing ratio, the second light source 34 is configured to emit light at a second wavelength spectrum which obtains a viewing ratio under a moderate external lighting condition of at least 75%, or at least 50%, or at least 40%, or at least 25%, of the maximum viewing ratio.

Finally, with a bright external lighting condition in mind, the third light source 36 is configured to emit light at a third wavelength spectrum (with a maximum peak emission wavelength different from the maximum peak emission wavelength of both the first and second wavelength spectra) which causes the fluorescent object within the aquarium 10 to fluoresce brightly, and it is even less important whether it otherwise creates visible ambient light within the tank 12. The third light source 34 must have a high intensity at or near an excitation wavelength peak for the fluorescent object, even if that peak is in the visible range. Because it is mostly unimportant whether the third light source 36 emits visible light (because there is already bright ambient light), a light with a very high intensity at or near an excitation wavelength peak is required. An appropriate choice for the third light source 36 may be a light which emits mostly white light. In terms of the viewing ratio, the third light source 34 is configured to emit light at a third wavelength spectrum which obtains a viewing ratio under a bright external lighting condition of at least 75%, or at least 50%, or at least 40%, or at least 25%, of the maximum viewing ratio.

The operation of the light sources 32, 34, 36 is controlled by the electronic control 38, as described above. In this specific example, the control 38 is configured with three individual toggle switches 44 to turn on/off each individual light source 32, 34 or 36, while the other light sources are left off. If a light sensor and automatic electronic control 38 are utilized, the control 38 turns on one of the three light sources 32, 34, or 36 depending on the external lighting condition detected by the light sensor.

The appropriate configuration of the light sources 32, 34, 36 may be chosen by knowing the excitation and emission spectrum of the particular fluorescent object(s) to be displayed in the aquarium 10, the particular external lighting condition, and by making reference to the visible light spectrum.

The light sources 32, 34, 36 may be any suitable type of light source, including without limitation, LED, incandescent light, fluorescent light, laser, xenon lamps, or a combination thereof. The lights may include filters in order to modify the wavelength spectra of the light source. Moreover, the light sources 32, 34 36, may be an array of individual lights, such as the arrays as shown in FIG. 1. The control 38 may be activated in any number of ways, including a manual switch, a push-button toggle, an infra-red remote, a radio frequency remote, an internal or external motion sensor, or a chemical or thermal activator. The control 38 may also cause to the light sources 32, 34, 36 to operate in a variety of modes such as fading and transition modes, timer modes or light sensing modes.

In order to enhance the appearance of the transgenic fluorescent fish, the aquarium 10 may further comprise light filters in or on the tank to block light outside the wavelength of the emission spectra of the particular fluorescent proteins in the transgenic fluorescent fish. The appearance of the fluorescent fish could also be enhanced using mirrors, one-way films, wavelength specific or polarizing films, specially angled walls of the tank or the use of special materials within the tank such as reflective mica rocks or such.

The tank 12 may have physical separators to maintain certain fish in different areas of the tank 12 that are lit by the different light sources 26.

Figure 3:
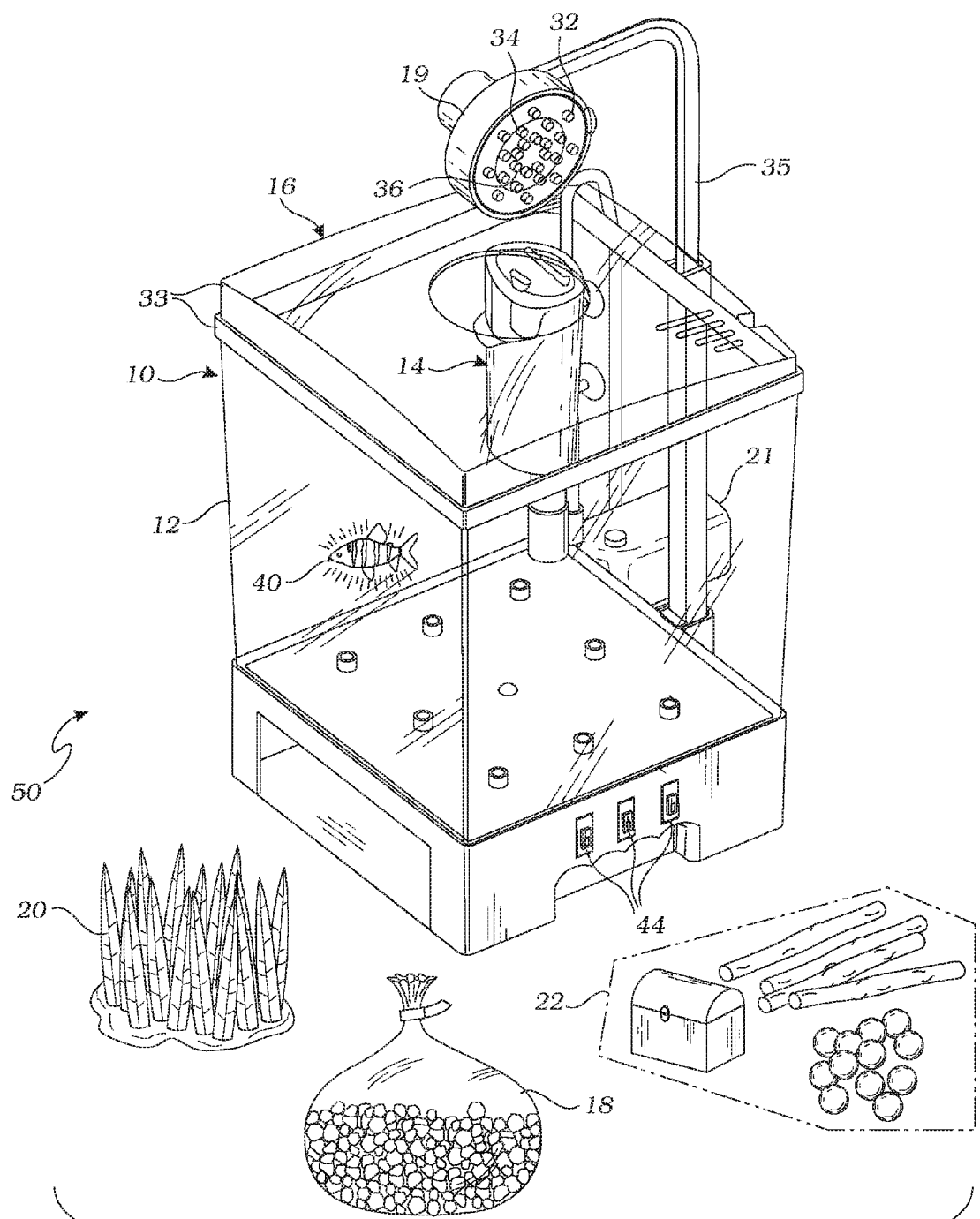
FIG. 3 is an aquarium kit in accordance with the present invention.

Turning to FIG. 3, an aquarium kit 50 may comprise the aquarium 10 described above, in addition to various ornamental features such as gravel 18, plants 20 and curios 22. The gravel 18, plants 20 and curios 22 may also be fluorescent to augment the appearance of the aquarium kit 50. For example, the plants 20 may be transgenic or other specialty plants which are fluorescent. The curios 22 can be small items such as a miniature treasure chest, marbles, artificial or actual marine objects like coral, rocks or sticks.

The aquarium kit 50 may also include the transgenic fluorescent ornamental fish 40 as shown in FIG. 3. Transgenic fluorescent ornamental fish and the method of producing them are described in detail in U.S. Pat. No. 7,135,613 (which is incorporated by reference herein in its entirety), and therefore only a general description will be included herein. Generally, a transgenic fluorescent ornamental fish is produced by inserting a foreign gene which codes for a fluorescent protein into the genome of the host fish. Typically, the fluorescent gene is operatively linked to either an endogenous or exogenous promoter in the fish such that activation of the promoter causes expression of the fluorescent protein coded by the fluorescent gene. A chimeric fluorescent gene construct comprises a promoter operatively linked to a heterologous gene. For example, a chimeric fluorescent gene construct can comprise a promoter of a zebrafish operatively linked to a GFP gene or other fluorescent protein gene.

A stable transgenic ornamental fish line may be obtained by producing an ornamental transgenic fish comprising one or more chimeric fluorescence genes positioned under the control of a promoter such that the fish expresses one or more fluorescent proteins encoded by the fluorescence genes at a level sufficient that the fish fluoresces upon exposure to an excitation light source. The transgenic fish is then bred with a second fish to obtain offspring. Finally, a stable transgenic fish line that expresses the fluorescent proteins is selected from the offspring. The stable transgenic fish line may then be used to breed large numbers of ornamental fluorescent transgenic fish.

What is claimed is:

1. An aquarium for displaying a fluorescent fish under an external lighting condition, the term "fluorescent" as used herein means the emission of light at an emission wavelength resulting from the absorption of an excitation light at an excitation wavelength lower than the emission wavelength, the aquarium comprising:
an aquatic tank;
a first light source configured to emit light at a first wavelength spectrum having a first maximum peak emission wavelength which enhances the display of a fluorescent fish within said tank under a dark external lighting condition;
a second light source configured to emit light at a second wavelength spectrum having a second maximum peak emission wavelength different from said first maximum peak emission wavelength which enhances the display of the fluorescent fish within said tank under a bright external lighting condition; and
at least one electronic control for controlling the operation of said first and second light sources such that the first and second light sources may be selectively turned on/off.

2. The aquarium of claim 1, wherein said electronic control is configured to automatically control said first and second light sources based on said external lighting condition.

3. The aquarium of claim 1, wherein said electronic control further comprises a light sensor for detecting said external lighting condition and said electronic control automatically controls said first and second light sources based at least in part on a reading from said light sensor.

4. The aquarium of claim 1, further comprising a third light source configured to emit light at a third wavelength spectrum having a maximum peak emission wavelength different from said first and second maximum peak emission wavelengths which enhances the display of the fluorescent fish within said tank under a moderate external lighting condition, said third light source operably coupled to said electronic control.

5. The aquarium of claim 1, wherein said first and second light sources are each an array of LEDs.

6. The aquarium of claim 1, wherein said electronic control is configured for selectively turning on/off said first and second light sources independently of the other.

7. The aquarium of claim 1, wherein said electronic control is set based on pre-determined chronological parameters, including both absolute time and relative time.

8. The aquarium of claim 1, further comprising a fluorescent ornamental fish.

9. The aquarium of claim 1, further comprising one or more of gravel, water conditioner, plants, filter, aeration system, food, curios, rocks, or ornamental features.

10. An aquarium for displaying a fluorescent fish under an external lighting condition, the term "fluorescent" as used herein means the emission of light at an emission wavelength resulting from the absorption of an excitation light at an excitation wavelength lower than the emission wavelength, the aquarium comprising:
an aquatic tank;
a plurality of light sources of different wavelengths, said light sources configured to allow for certain of said plurality of light sources to be activated for selection of a lighting combination which creates a viewing ratio of at least 75% of a maximum viewing ratio of a living, fluorescent fish under at least two ambient lighting conditions, including a bright external lighting condition and a dark external lighting condition; and
at least one electronic control for controlling the operation of said light sources such that an optimal lighting combination may be selected.

11. The aquarium of claim 10, wherein said electronic control is configured to automatically control said plurality of light sources based on said external lighting condition.

12. The aquarium of claim 10, wherein said electronic control further comprises a light sensor for detecting said external lighting condition and said electronic control automatically controls said plurality of light sources based at least in part on a reading from said light sensor.

13. The aquarium of claim 10, wherein each light source of said plurality of light sources comprises an array of LEDs.

14. The aquarium of claim 10, wherein said electronic control is configured for selectively turning on/off each light source of said plurality of light sources independently of the other light sources.

15. The aquarium of claim 10, further comprising a transgenic, fluorescent ornamental fish.

16. The aquarium of claim 10, further comprising one or more of gravel, water conditioner, plants, filter, aeration system, or food.

17. The aquarium of claim 10, wherein said electronic control is set based on pre-determined chronological parameters, including both absolute time and relative time.

18. An aquarium kit adapted to be assembled for displaying a fluorescent fish under an external lighting condition, the term "fluorescent" as used herein means the emission of light at an emission wavelength resulting from the absorption of an excitation light at an excitation wavelength lower than the emission wavelength, the aquarium kit comprising:
an aquatic tank;
a plurality of light sources of different wavelengths, said light sources configured to allow for certain of said plurality of light sources to be activated for selection of a lighting combination which creates a viewing ratio of at least 75% of a maximum viewing ratio of a living, fluorescent fish under at least two ambient lighting conditions, including a bright external lighting condition and a dark external lighting condition; and
at least one electronic control for controlling the operation of said light sources such that an optimal lighting combination may be selected.

19. The aquarium kit of claim 18, wherein said electronic control is configured to automatically control said plurality of light sources based on said external lighting condition.

20. The aquarium kit of claim 18, wherein said electronic control further comprises a light sensor for detecting said external lighting condition and said electronic control automatically controls said plurality of light sources based at least in part on a reading from said light sensor.

21. The aquarium kit of claim 18, wherein said plurality of light sources are each an array of LEDs.

22. The aquarium kit of claim 18, wherein said electronic control is configured for selectively turning on/off said plurality of light sources independently of the other.

23. The aquarium kit of claim 18, wherein said fluorescent object is a transgenic, fluorescent ornamental fish, and said aquarium kit further comprises a transgenic, fluorescent ornamental fish.

24. The aquarium kit of claim 18, further comprising one or more of gravel, water conditioner, plants, aeration system, filter, food, curios, rocks, or ornamental features.

25. The aquarium of claim 18, wherein said electronic controller is set based on pre-determined chronological parameters, including both absolute time and relative time.

* * * * *